United States Patent [19]

Sutton

[11] Patent Number: 4,771,970
[45] Date of Patent: Sep. 20, 1988

[54] PRESSURE FLOW CONTROL DEVICE

[76] Inventor: Stephen J. Sutton, 9 Niagara Street, Ontario, Canada, M5V 1C2

[21] Appl. No.: 26,159

[22] Filed: Mar. 16, 1987

[51] Int. Cl.⁴ .............................................. B64D 17/02
[52] U.S. Cl. .................................... 244/145; 244/146; 244/152
[58] Field of Search ............... 244/142, 145, 146, 152, 244/902

[56] References Cited

U.S. PATENT DOCUMENTS

| 3,393,885 | 7/1968 | Neumark | 244/145 |
| 3,724,789 | 4/1973 | Snyder | 244/145 |
| 3,809,342 | 5/1974 | Lemoigne | 244/145 |
| 3,893,641 | 7/1975 | Sutton | 244/145 |
| 4,175,722 | 11/1979 | Higgins | 244/145 |

FOREIGN PATENT DOCUMENTS

| 2310258 | 5/1975 | France | 244/902 |
| 144792 | 6/1920 | United Kingdom | 244/152 |

Primary Examiner—Galen L. Barefoot
Attorney, Agent, or Firm—Pettis & McDonald

[57] ABSTRACT

The invention provides a pressure flow control device of the type used primarily to maintain both vertical and horizontal stability and manueverability in a predetermined fluid environment. The device includes the first skin of predetermined configuration, a second skin of predetermined configuration disposed in substantially spaced apart configuration relation from the first skin and a plurality of third skin disposed in interconnecting relation between the first and second skins. One or more spors are defined by the first, second and third skins. One end of the spors at least partially defines a leading edge of the device and the opposite end of the spors at least partially defines the trailing edge of the device. One or more holonomic ports are formed in at least one of the third skins and a jet port is defined by at least a portion of one or more of the spors being open at its aft end. Fluid flow through at least a portion of the group consisting of the jet port and the holonomic ports is selectively restricted to control fluid pressures within the one or more spors.

52 Claims, 7 Drawing Sheets

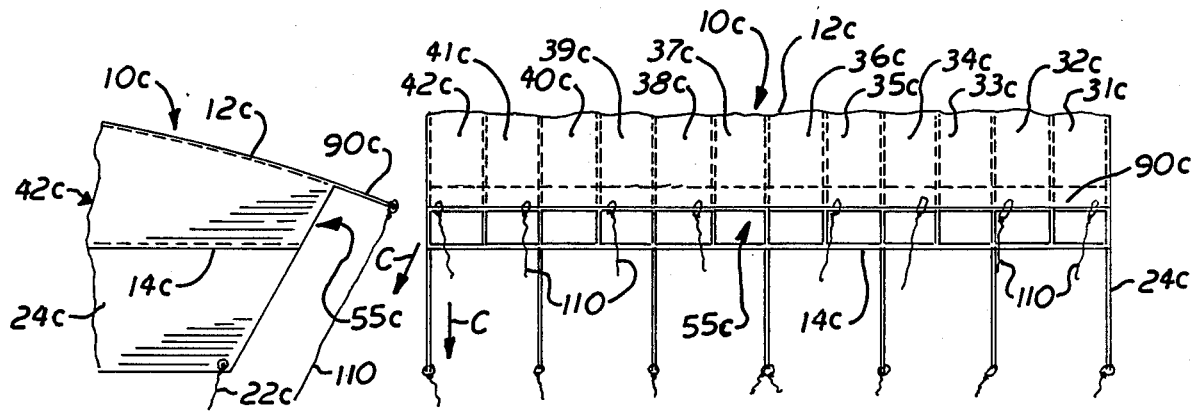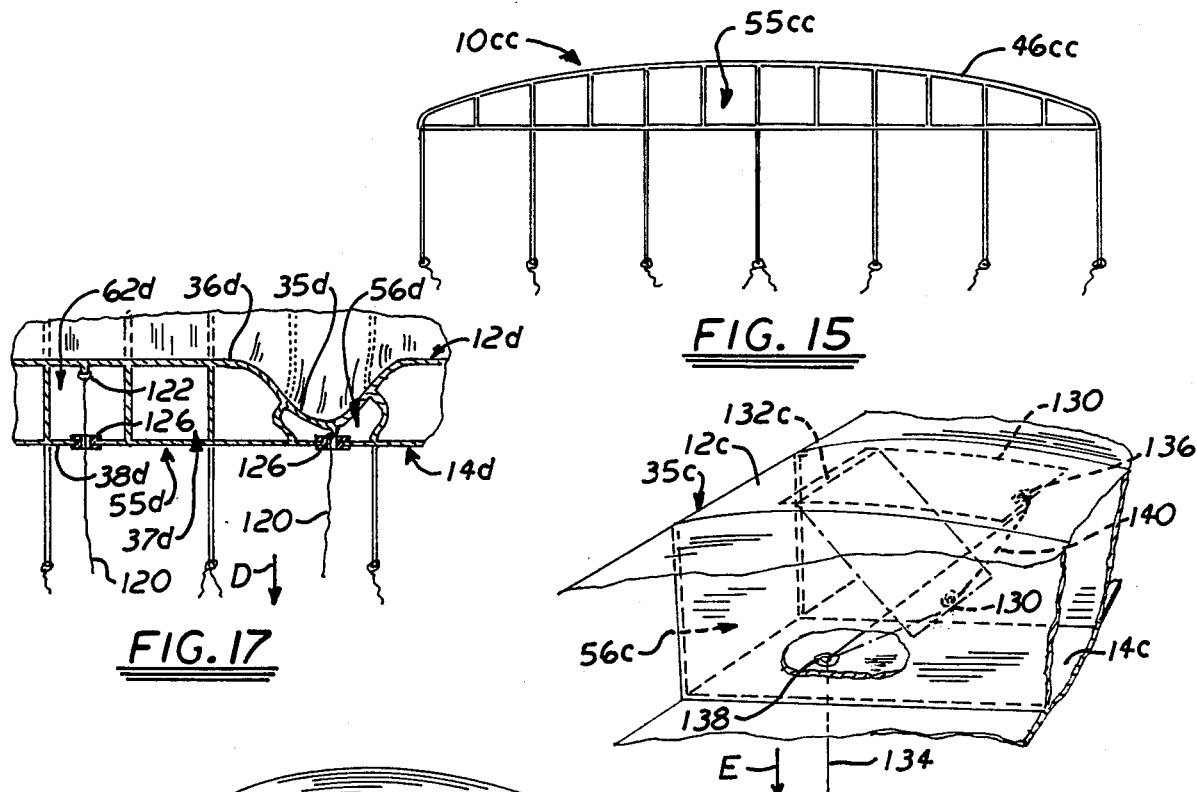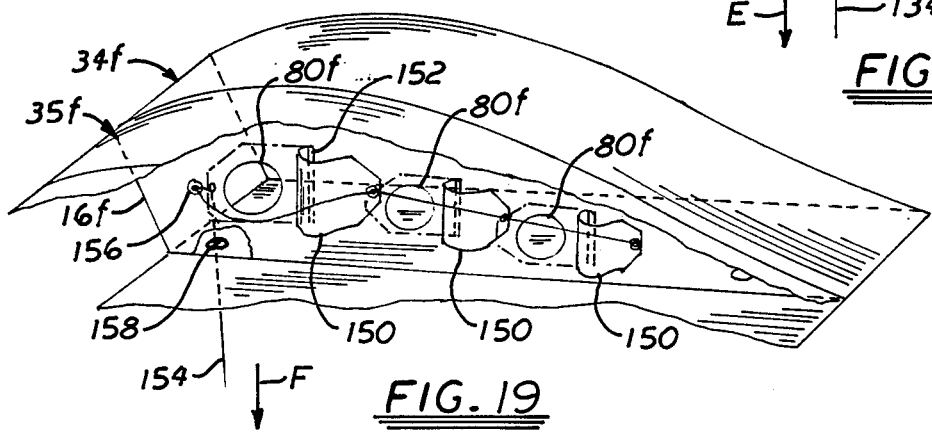

PRESSURE FLOW CONTROL DEVICE

BACKGROUND OF THE INVENTION

This invention relates to a pressure flow control device for use primarily in combination with a flow device of the type used to maintain both vertical and horizontal stability and maneuverability through a predetermined fluid environment.

Flow devices that exhibit improved stability and maneuverability through a fluid medium are well known. For example my prior U.S. Pat. Nos. 3,893,641 and 3,945,592, (the specifications of which are incorporated herein by reference) both disclose flow devices comprising a plurality of cells or spors and featuring a number of elements, including jet ports, Jordan clusters, holonomic ports, jiro ports and control means that permit the rate and direction of travel and descent through the fluid medium to be carefully controlled. Accordingly, such devices have proven to be extremely advantageous for use as parachutes and kites and in other flow device applications.

Presently, however, a great need exists for a flow device that exhibits even better stability and maneuverability than the devices discussed above. Most conventional devices do not allow the operator to regulate the fluid flow through the device or the intercellular pressure therein. As a result, the consequent fluid from drag on various portions of the device cannot be readily controlled. Precise maneuvers such as turning are therefore hindered. Additionally, present flow devices provide for far less than optimal control over the thrust and direction of travel of the device through the fluid environment.

Adequate control over flow device travel is a serious concern. In many flow applications, such as parachuting, it is critically important that the operator possess a considerable degree of control over the internal pressures and configuration of the flow device and its resultant aerodynamic characteristics.

SUMMARY OF THE INVENTION

This invention relates to a pressure flow control system for a flow device, which system significantly improves the stability and maneuverability of the flow device through a fluid medium. The system is particularly suited for use in combination with flow devices such as gliders, parachutes and kites although it may also be employed with alternative devices designed for travel through various liquid or gaseous environments. This invention results at least in part from a realization that the drag on various portions of a flow device and hence the maneuverability and stability of the device may be controlled by regulating the internal pressures in one or more of the spors or cells that comprise the device. This affects the drag in a manner analogous to adjusting the depth of camber of the cells. For example, by increasing the pressure on an individual spor, the aerodynamic drag on that spor is correspondingly increased in much the same way as would occur by increasing the camber of that spor. Additionally, this invention recognizes that by controlling the passage of fluid through the various spors of the flow device thrust can be regulated. By providing the operator with a greater degree of control over such drag and thrust he is permitted to control more closely the stability and maneuverability of the flow device.

This advantageous result is accomplished by providing a pressure flow control device of the type used primarily to maintain both vertical and horizontal stability and maneuverability in a predetermined fluid environment. The device includes a first skin means of predetermined configuration, a second skin means of predetermined configuration disposed in substantially spaced apart relation from the first skin means and a plurality of third skin means disposed in interconnecting relation between the first and second skin means. There are spor means defined by the first, second and third skin means. One end of the spor means at least partially defines a leading edge of the device. The opposite end of the spor means at least partially defines the trailing end of the device. Holonomic port means are formed in at least one of the third skin means. Jet port means are defined by at least a portion of the spor means being opened at its aft end. There are means for selectively restricting fluid flow through at least a portion of the group consisting of the jet port means and the holonomic port means to control fluid pressure within the spor means.

In a preferred embodiment control means operatively connected to the second skin means are provided for controlling the passage of the device through a predetermined fluid environment with respect to horizontal and vertical planes. The restricting means may include at least a segment of the jet port means that is recessed relative to the aft end of an adjacent section of the spor means. The restricting means may include an overhanging section attached to the trailing end of the first skin means of the jet port means and extending in an aft direction beyond the second skin means of the jet port means. The means for selectively restricting may further include overhang control means that are operatively connected to the overhanging section for selectively covering at least a portion of the jet port means with the overhanging section to restrict fluid flow therethrough.

The means for selectively restricting may include shroud means connected to the aft end of the portion of the spor means defining the jet port means. Shroud control means may be operatively connected to the shroud means for selectively covering at least a portion of the jet port means with the shroud means to restrict fluid flow therethrough. The shroud means may be interconneted to the first skin means between the recessed segment of the jet port means and the adjacent section of the spor means. The shroud means may be attached to the recessed segment substantially between a pair of adjacent third skin means. Alternatively, it may be attached to the recessed segment substantially between at least three adjacent third skin means. At least a portion of the spor means adjacent to the recessed segment may also serve as means for restricting.

The means for selectively restricting may include jet port control means operatively connected to the first skin means within the jet port means for selectively blocking at least a portion of the jet port means with the first skin means to restrict fluid flow therethrough. Such jet port control means may include a jet port control line attached to the first skin means and the second skin means may include jet port control guide means for passing the jet port control line therethrough. The control line is pulled through the jet port control guide means to block at least a portion of the jet port means with the first skin means.

The means for selectively restricting may include jet port flap means attached within the jet port means to the first skin means and jet port flap control means operatively connected to the jet port flap means for selectively covering at least a portion of the jet port means with the jet port flap means to restrict fluid flow therethrough. Such jet port flap control means may include a jet port flap control line attached to the jet port flap and jet port flap control line guide means for passing the jet port flap control line therethrough. The jet port flap control line may be pulled through the jet port flap control line guide means to cover at least a portion of the jet port means with the jet port flap means. Elastic means may be provided for biasing the jet port flap means into an open condition and permitting those flap means to selectively close in response to operation of the jet port flap control means.

The means for selectively restricting may include holonomic port control means operatively connected to at least one of the group consisting of the first skin means and the third skin means within the spor means for selectively blocking at least a portion of the holonomic port means to restrict fluid flow therethrough. The holonomic port control means may include a holonomic port control line attached to the first skin means and the second skin means may include second skin guide means for passing the holonomic port control line therethrough. The holonomic port control line may be pulled through the second skin guide means to block at least a portion of the holonomic port means with the first skin means. Alternatively, the holonomic port control means may include holonomic port control line attached to the third skin means and the second skin means may include holonomic port control line guide means for passing the holonomic port control line therethrough. The holonomic port control line may be pulled through the second skin means to block at least a portion of the holonomic port with the third skin means.

The means for selectively restricting may further include holonomic flap means attached within the spor means to the third skin means and holonomic flap control means operatively connected to the holonomic flap means for selectively covering at least a portion of holonomic port means with the holonomic flap means to restrict fluid flow therethrough. The holonomic flap control means preferably include a holonomic flap control line attached to the holonomic flap. The third skin means includes a first holonomic flap control line guide means for passing the holonomic control line therethrough. The second skin includes a second holonomic control line guide means for passing the holonomic flap control line therethrough. The holonomic flap control line is pulled through the first and second holonomic flap control line guide means to cover at least a portion of the holonomic port means with the holonomic flap means. Alternatively the holonomic flap means may be attached above the holonomic port means and a control line extending through guide means in just the second skin means may be provided to selectively pull the flap means closed. In either case an elastic element may be provided to bias the holonomic control flap means into an open condition.

The spor means may include a centrally located third skin means having a single holonomic port. The aft end of the spor means may be open. Alternatively at least a portion of the aft end of the spor means may be closed by interconnecting the first and second skin means. The shape and cubic displacement of the spor means are typically determined by the third skin means and depend on the predetermined configuration. The distance between the first and second skin means is usually variable from the leading edge to the trailing edge. For example, the distance between the first and second skin means at the middle of the device may be relatively greater than the distance at the leading and trailing edges of the device. The distance between the first and second means at the leading edge may be relatively greater than the distance at the trailing edge. In such cases the third skin means may be correspondingly configured to define a substantially triangular configuration, the apex of the triangular configuration being substantially adjacent to the trailing edge. Typically the predetermined configuration is a square or other substantially rectangular shape, although the scope of the invention is not limited to any particular shape.

The holonomic ports may be formed in the third skin means with the midpoint of each of the holonomic ports defining a line substantially parallel to the leading edge. The holonomic ports may be of greater size at the centermost of the third skin means and may be of correspondingly reducing size toward the outermost of the third skin means. Alternatively, the outermost holonomic ports may be of greater size and the size of the ports may reduce toward the center of the device. In still other embodiments irregular size patterns may be exhibited by the holonomic ports.

A plurality of first Jordan clusters may be formed in the first skin means and a plurality of second Jordan clusters may be formed in the second skin means. Alternatively only one or more of the skin means may include such Jordan clusters. The first Jordan clusters are typically of greater size at the outermost edges of the first skin means and are of correspondingly reducing size at the center of the first skin means. Similarly the second Jordan clusters may increase in size from the center to the outboard ends. Conversely the respective Jordan clusters may decrease in size from the center to the outboard ends. Again these particular patterns of size and shape may vary and are not a limitation of this invention. The first and second Jordan clusters may be spaced apart one from the other across at least most of the first and second skin means.

The jet port means is typically formed at substantially the middle of the trailing edge. A jiro port means may be formed at substantially the center of the second skin means. Payload means may depend from the device and control means may operatively interconnect the payload means with the second skin means. Such payload means typically depend from the device beneath the area defined by the jiro port means and preferably beneath the center of the jiro port means. Vent means, alternatable between an open and closed condition, may be formed in the first skin. Such means are typically formed above the area defined by the jiro means. Vent control means may be operatively connected to the vent means for selectively opening the vent means to exhaust fluid from the spor means.

By controlling pressure flow through the jet port means and the holonomic port means the operator is able to adjust the internal pressure within the spors and hence the fluid flow transitive camber of the device. The form drag exhibited by the device and its resultant maneuverability and stability may therefore be closely regulated.

This invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention reference should be had to the following detailed description taken in connection with the accompanying drawings in which:

FIG. 13 is a fragmentary view of the trailing end of a preferred jet port means and of the overhanging section and control line thereto;

FIG. 14 is a elevational rear view of the jet port means of FIG. 13 and of the control means for selectively closing the overhanging section;

FIG. 15 is an elevational rear view of an alternative pressure flow control device according this invention having an open trailing end that is tapered from the center to the outboard sides;

FIG. 17 is a fragmentary elevational view of the jet port means and control lines attached to the first skin means for selectively closing the jet port means;

FIG. 18 is fragmentary axonometric view of the jet port means with a flap attached therein to the first skin means for selectively closing the jet port means;

FIG. 19 is a fragmentary axonometric view of a spor having three holonomic port means formed in the third skin means thereof and three flap means and an attached control line for selectively closing the holonomic port means;

Similar reference characters refer to similar parts throughout the several views of the drawings. In the alternative embodiments the similar reference characters are accompanied by lower case letter designations.

DETAILED DESCRIPTION OF THE PREFERRED EMBODIMENT

Figure 1:
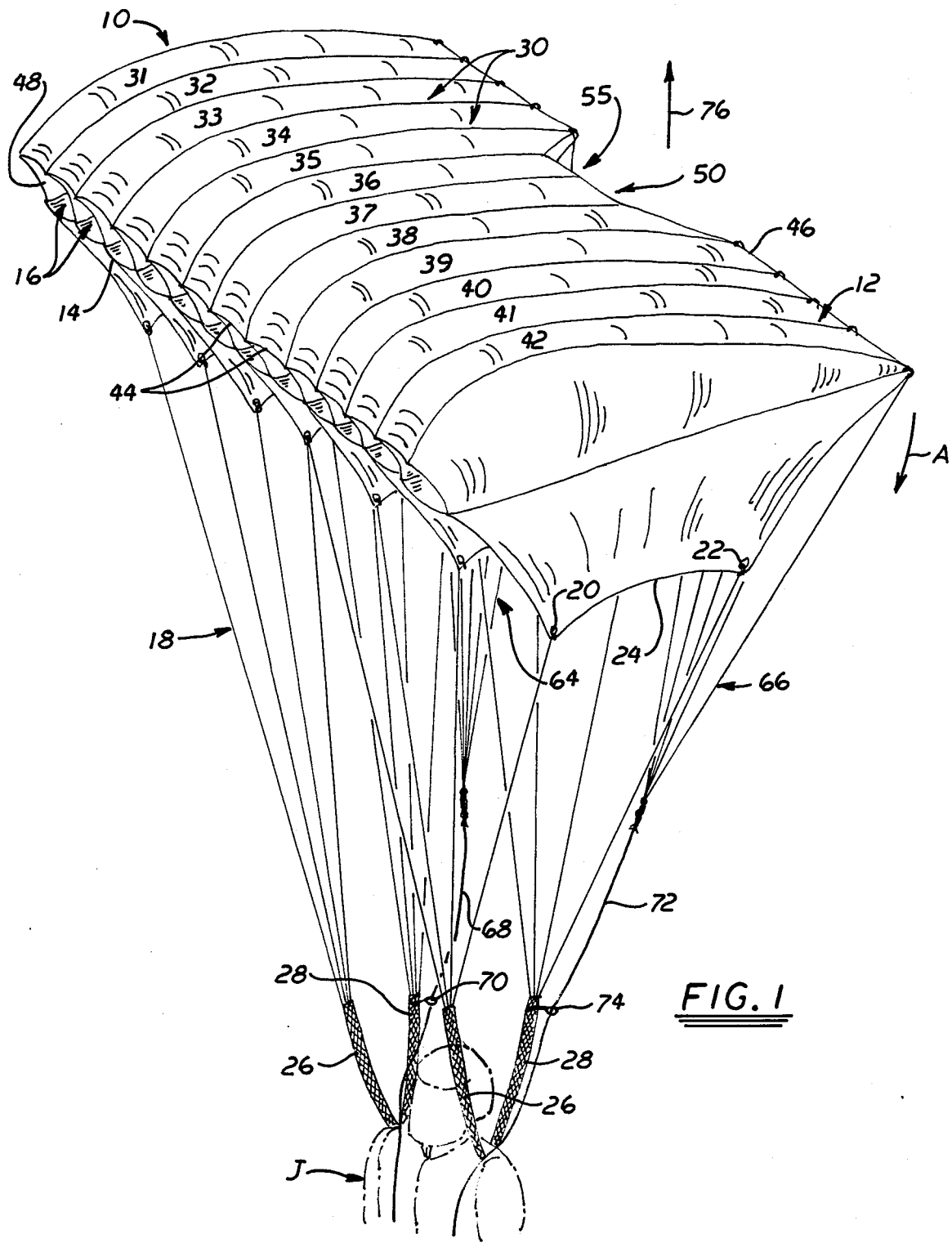
FIG. 1 is an axonometric view of a pressure flow control device according to this invention, which device is employed as a parachute.

There is shown in FIG. 1 a pressure flow control device 10 according to this invention, which device is being employed as a parachute. Device 10 comprises a first upper skin means 12 of substantially rectangular configuration, a second skin means 14 of substantially corresponding configuration disposed beneath and in corresponding relation to first skin 12, and a plurality of third skin means 16 disposed in interconnecting relation between the first and second skin means 12 and 14. Payload means comprising a jumper J depends from device 10. In particular, jumper J hangs by means of suspension lines 18 that are attached at two points 20 and 22 on each of a plurality of support sheets 24. Such sheets are attached to and depend from the bottom of second skin means 14. Suspension lines 18 are respectively connected to one of either front risers 26 or rear risers 28 that are secured to the shoulders of jumper J.

Device 10 is designed to maintain both the vertical and horizontal stability and maneuverability of jumper J as he travels through the air. This is accomplished by a construction that includes a plurality of spor means, generally indicated as 30 in FIGS. 1 and 2, which spor means are defined by first skin means 12, second skin means 14 and interconnecting third skin means 16. Spor means 30 comprises individual spors 31 through 42. One end 44 of spor means 30 defines a leading edge of device 10 and the opposite end 46 of spor means 30 defines the trailing end of the device. As shown most clearly in FIG. 1, each spor 31 through 42 includes an opening 48 at leading end 32. Trailing end 46 includes a recessed segment 50 that is formed centrally in the trailing end by terminating central spors 35 through 38 along recessed trailing end 51. It should be noted that in alternative embodiments such a recessed portion may be formed off-center in the trailing end. Recessed segment 50 assists in restricting fluid flow through the device as described more fully below.

Figure 3:
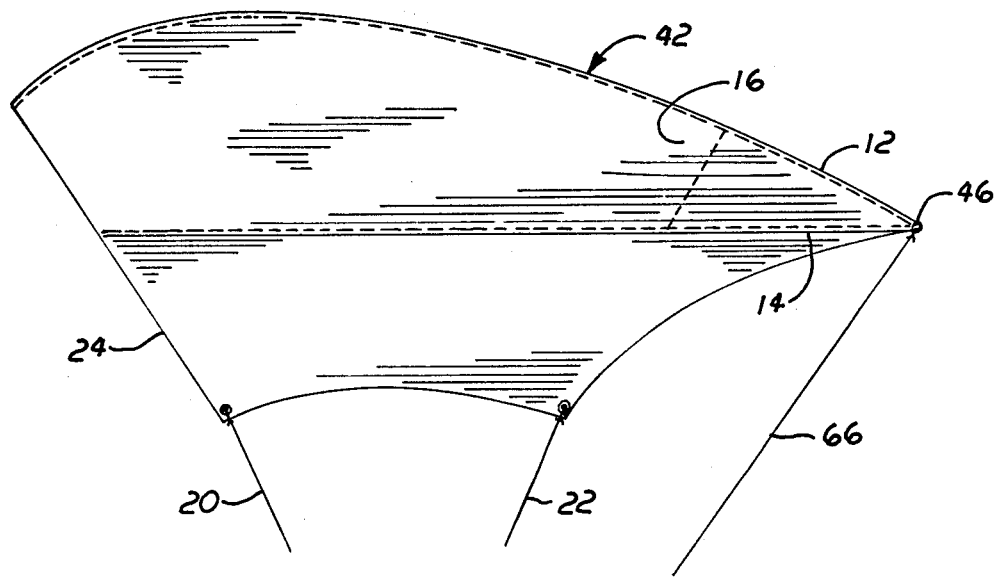
FIG. 3 is an elevational side view of the pressure flow control device.
Figure 9:
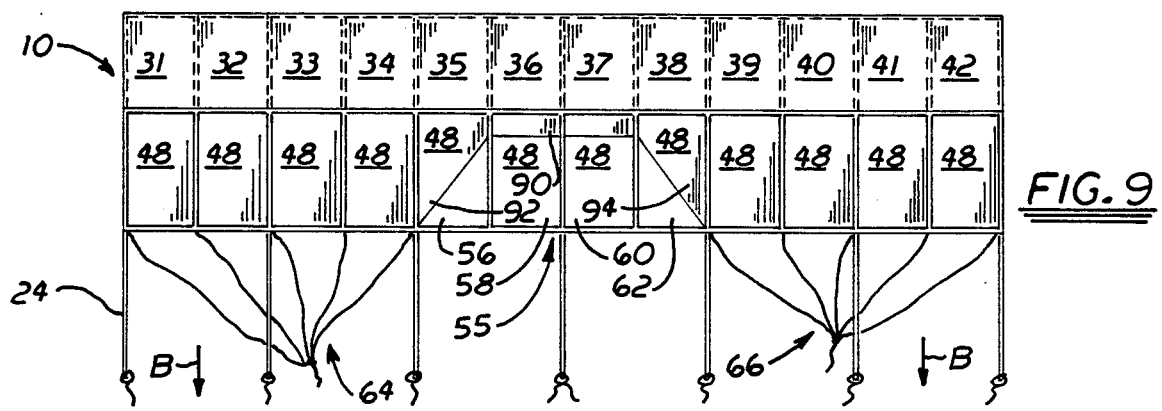
FIG. 9 is an elevational front view of the pressure flow control device of FIG. 1.
Figure 10:
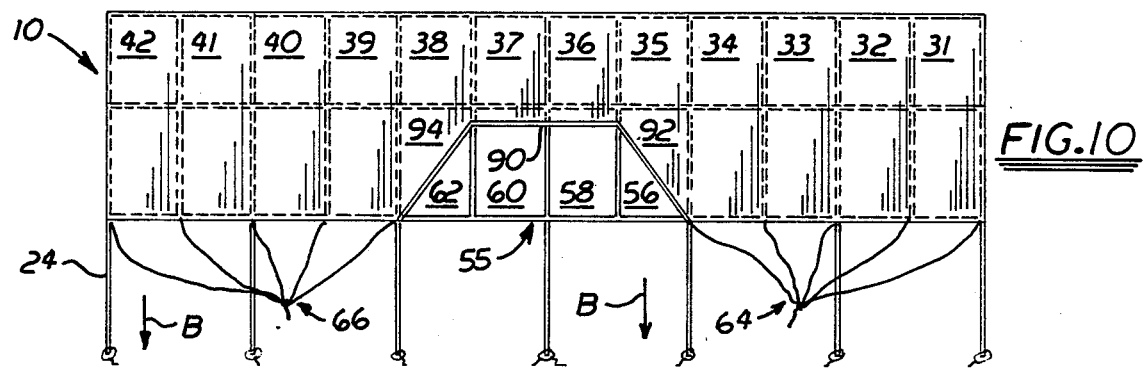
FIG. 10 is an elevational rear view of the pressure flow control device of FIG. 1.

As shown most clearly in FIGS. 1, 9 and 10 suspension line support sheets 24 are provided between alternating spors. For example, as shown in FIG. 3 a support sheet 24 is provided at the outboard end of the device. As further shown in FIGS. 6 and 7, for example, a support sheet 24 is formed between spors 39 and 38, and between spors 36 and 37, respectively. On the other hand, as exhibited in FIGS. 4 and 5 for example, no support sheet is provided between spors 31 and 32, or between spors 35 and 36, respectively.

The aft ends of spors 31 through 34 and 39 through 42 are closed and, as a result, a portion of the trailing end of device 10 is closed. This is accomplished as shown in FIG. 3, which figure discloses an outboard or tensor spor 42. Trailing end 46 is closed by connecting first skin 12 with second skin 14 at the aft end of spor 42. Similar closed aft ends are also exhibited by spor 32, as shown in FIG. 4 and spor 39, as shown in FIGS. 6, as well as each of the remaining spors 31-34, and 39 through 42.

Figure 2:
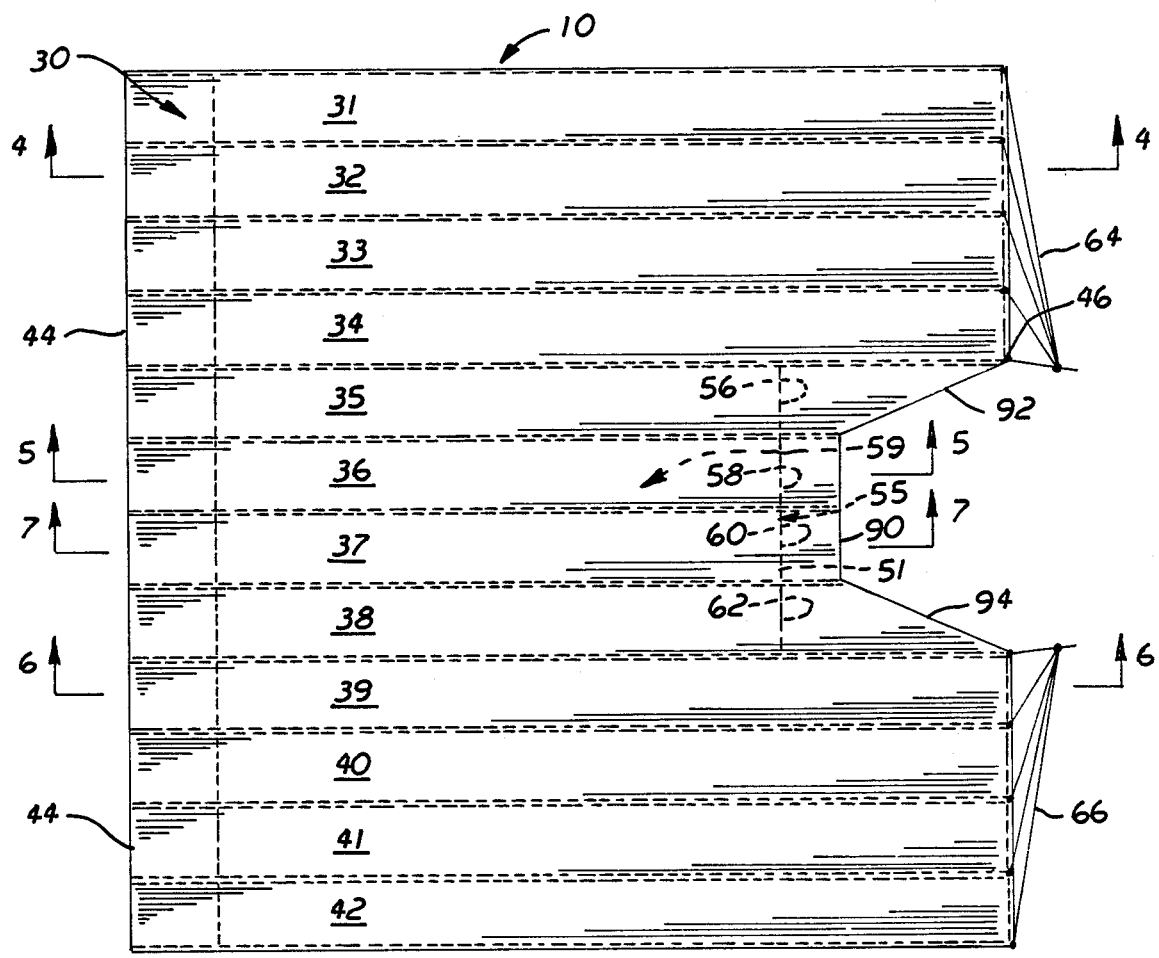
FIG. 2 is a top plan view of the pressure flow control device.
Figure 4:
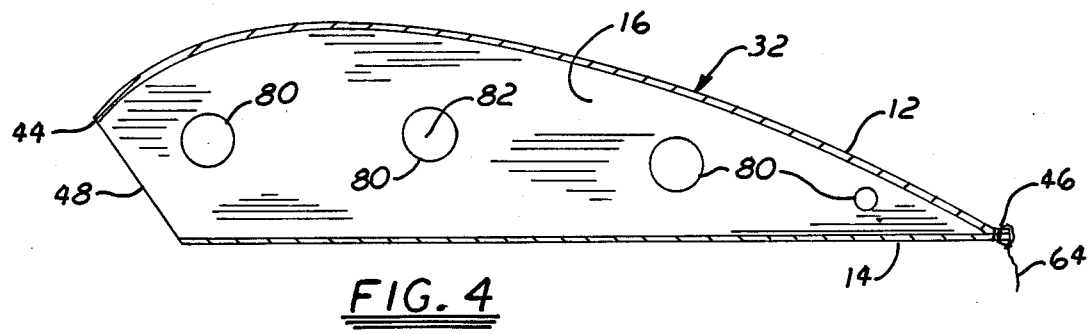
FIG. 4 is a sectional view taken along line 4—4 of FIG. 2.
Figure 5:
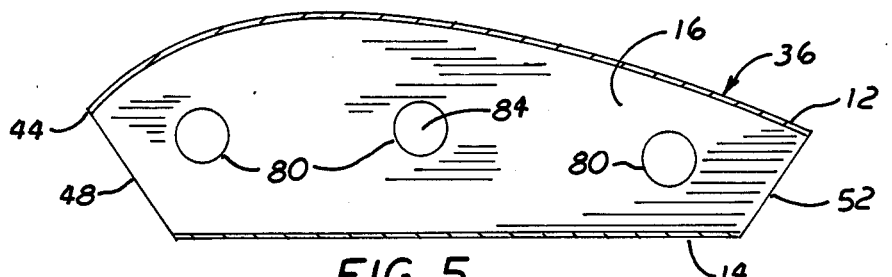
FIG. 5 is a sectional view taken along line 5—5 of FIG. 2.
Figure 6:
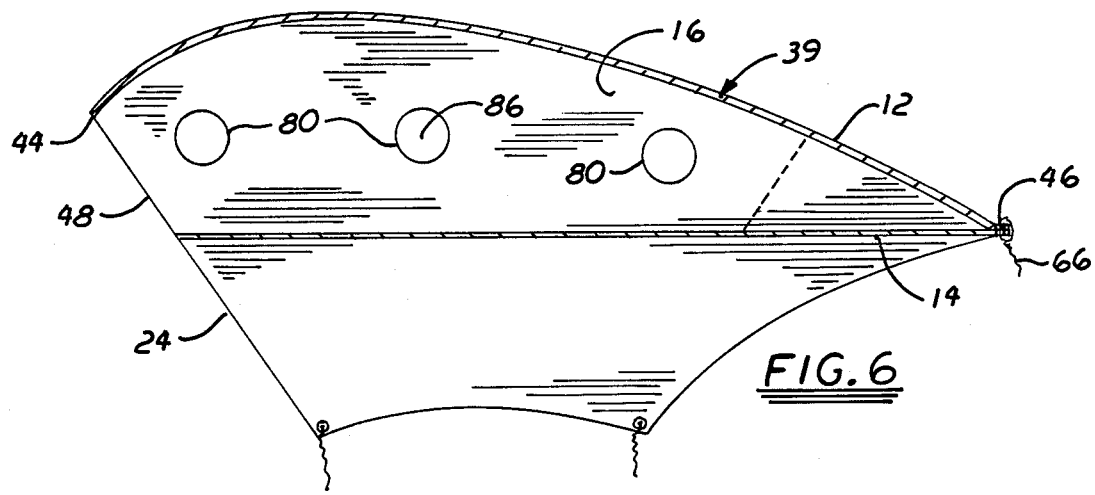
FIG. 6 is a sectional view taken along line 6—6 of FIG. 2.

As shown in FIGS. 3 through 7 the distance between the first skin means 12 and second skin means 14 is variable from leading edge 44 to trailing edge 46. Typically, the distance between first skin means 12 and second means 14 at the middle of the device is relatively greater than the distance at the leading and trailing edges of the device. As shown in FIG. 2, device 10 maintains a substantially square shape. As shown in FIGS. 3, 4 and 6, if the trailing end 46 is closed the distance between first skin means 12 and second skin means 14 at leading edge 44 is greater than at trailing end 46. In such spors exhibiting closed aft ends the third skin means 16 is correspondingly configured to define a substantially triangular configuration. The apex of the triangular configuration is substantially adjacent to trailing edge 46.

Figure 7:
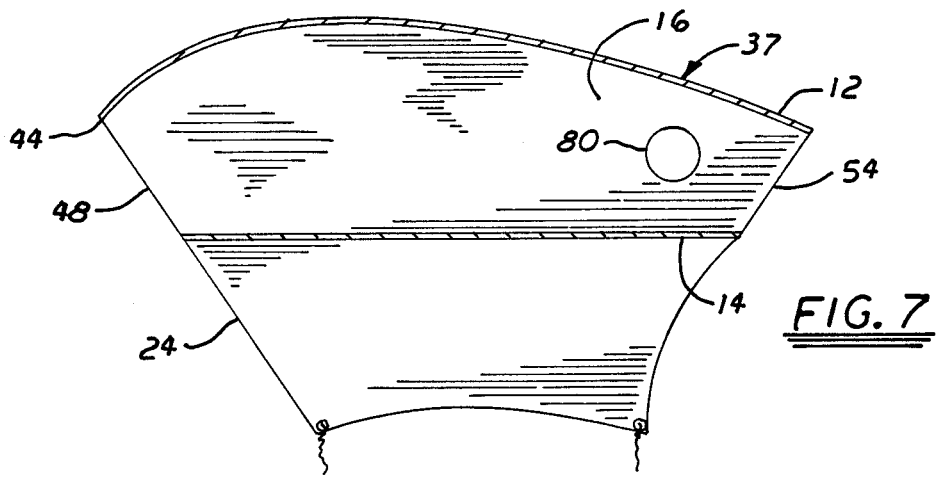
FIG. 7 is a sectional view taken along line 7—7 of FIG. 2.
Figure 8:
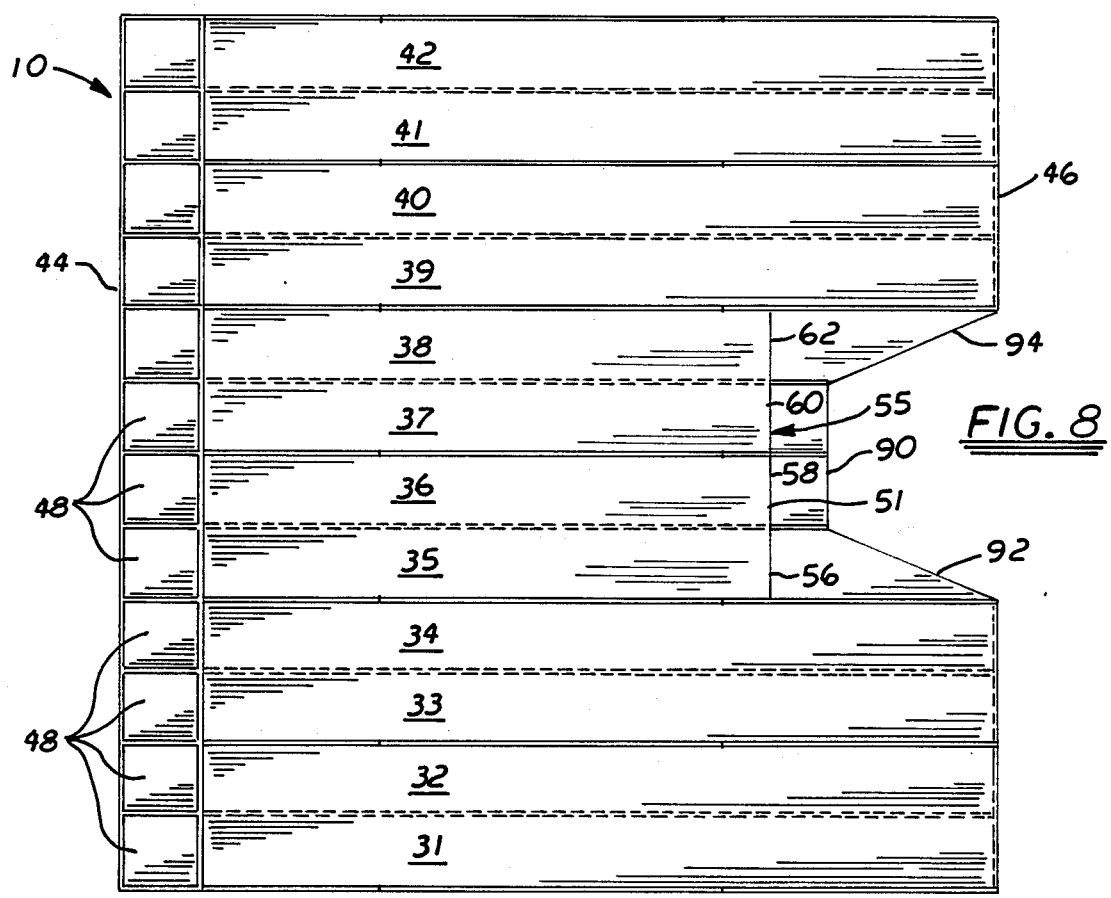
FIG. 8 is a bottom plan view of the pressure flow control device of FIG. 1.

The four spors 35 through 38 that form the recessed segment 50 have open aft ends. For example, as shown in FIGS. 5 and 7 spors 36 and 37 include open aft ends 52 and 54 respectively. Such open ends are formed because first skin means 12 and second skin means 14 remain spaced apart at the aft end and do not meet. The four spors 35 through 38 having open aft ends define a jet port means 55 shown in FIGS. 1, 2, 9 and 10 that includes four jet ports 56, 58, 60 and 62 formed by the respective open ended spors 35 through 38. Such jet port means 55 expel air that has been introduced through spors 35 through 38 both from openings 48 and from other ports formed in the device, which ports are described more fully below. As a result, spors 35 through 38 form a transitive manifold 59 that expels air outwardly through jet port means 55 to provide device 10 with a forward thrust as well as advantageous degrees of horizontal and vertical maneuverability and stability.

The maneuverability and stability of device 10 is improved considerably by the provision of control means 64 and 66, shown in FIGS. 1, 2 and 10. Control means 64, 66 comprise individual control lines that are respectively connected to second skin means 14 along the trailing end 46 of the spors 31 through 34 and spors 39 through 42 having closed aft ends. Control lines 64 that are attached to spors 31 through 34 join in a common line 68 shown in FIG. 1 that extends through a ring 70 mounted to right rear riser 28, and then extends to jumper J. Similarly, the control lines 66 that are attached to spors 39 through 42 are joined in a common line 72 that extends to jumper J through a ring 74. As a result, the jumper is able to controllably raise or lower the aft ends of spors 31 through 34 by operating line 68 with his right hand and is similarly able to raise and lower the trailing end 46 of spors 39 through 42 by operating line 72 with his left hand. As shown in FIGS. 3, 4 and 6 each of the spors having a closed aft end include a control line 64 or 66 whereas the spors 35 through 38 that do not have a closed end such as are disclosed in FIGS. 5 and 7 do not have a control line attached to the aft end thereof.

By raising and lowering control lines 64, 66 jumper J is able to regulate the direction and speed of travel of device 10 through the air. For example, in accordance with the teaching of this invention the trailing end 46 defined by the closed spors may be raised and lowered by control lines 64, 66 relative to the recessed segment 50 of jet port means 55 to restrict airflow through the jet port means. As control lines 64, 66 are lowered in the direction of arrow A a shown in FIG. 1 an increased pressure air flow 76 is produced through recess 50. This airflow 76 effectively blocks the rearward expulsion of air from jet ports 55 and as a result slows the forward thrust of device 10.

To permit fluid flow communication between the individual spors 31 through 42 one or more holonomic port means 80, shown in FIGS. 4, 5, 6 and 7, are provided in the third skin means 16 interconnecting each adjacent pair of spors. As shown in FIG. 3 the outermost tensor spor 42 and, similarly, the opposite tensor spor 31 include no holonomic ports on their outside walls. The mid-points of the laterally adjacent holonomic ports, for example mid-points 82, 84 and 86 shown in FIGS. 4, 5 and 6 respectively may define a line substantially parallel to the leading edge 44. Alternatively, the holonomic port may be disposed in non-aligned and other irregular patterns in third skin means 16. Moreover, although the ports are disclosed as circular, other irregular shapes may be employed. Typically, holonomic ports 80 are of their greatest size at centermost third skin means 16, shown in FIG. 7, and are of correspondingly reducing size toward the outermost third skin means 16 employed in spors 31 and 42. However, in alternative embodiments the holonomic ports may be of their greatest size at the outboard ends of device 10 and may be of correspondingly reducing size toward the centermost third skin means 16.

As shown in FIG. 7 centermost third skin means 16 includes only a single holonomic port 80. As a result the fluid communication between the spors 31 through 34 and 39 through 42 on the one hand, and the spors 35-38 forming transitive manifold 59 is restricted. Premature pressure equalization is thereby avoided and jet port means 55 contribute must more significantly to improved maneuverability and stability.

As shown most clearly in FIGS. 2 and 8 through 10, additional means may be provided for restricting the fluid flow through jet port means 55. Such restricting means includes an overhanging section 90 that is attached to jet port means 55. In particular, overhanging section 90 is an integral extension of the first skin means 12 of spors 36 and 37. Overhanging section 90 extends in an aft direction beyond the trailing edge 51 of second skin means 14. Additionally, the restricting means include shroud means comprising a pair of substantially wedge shaped shroud elements 92 and 94 that are respectively integrally connected to the aft end of the spors 35 and 38 defining jet port means 55. In particular, shroud element 92 is an integral continuation of first skin means 12 and is connected to open ended spor 35, overhanging section 90 and adjacent closed end spor 34. As a result, shroud element 92 is suspended over the area aft of jet port 56. Similarly, shroud element 94 is formed integrally with first skin means 12 and is connected to open ended spor 38, overhanging section 90 and adjacent closed ended spor 39 so that the shroud element is suspended over the area aft of jet port 62.

The overhanging portion 90 and shroud elements 92 and 94 provide jumper J with the capability or partially or entirely closing the trailing open end of one or more of the jet ports 56 through 62 of jet port means 55. This may be accomplished, as shown in FIGS. 9 and 10, by operating the control lines 64, 66 that depend from second skin means 14 as previously described. By pulling left hand control line 66 downwardly in the direction of arrow B the jumper lowers shroud element 94 and at least a portion of overhanging section 90 so that they at least partially cover jet ports 60 and 62 extending out the trailing end of spors 37 and 38, respectively. By closing down the jet ports 60 and 62 the pressure within spors 37 and 38, respectively, is increased. This pressure increase is transmitted through holonomic ports 80 to the remaining spors 39 through 42 on the left hand side of device 10. However, a pressure increase on the right hand side of the device is restricted by providing the centermost third skin 16 with only a single holonomic port 18 in the manner previously described. As a result, form drag on the left hand spors 37 through 42 of device 10 is increased. Likewise, by pulling right hand control lines 64 downwardly in the direction of arrow B shroud element 92 and overhanging section 90 selectively cover a part or all of jet ports 56 and 58 formed in spors 35 and 36, respectively. This increases the pressure within spors 35 and 36 and the pressure flow is spread through the holonomic ports to spors 31 through 34. This increases the form drag on right hand spors 31 through 36. By reversing this operation and releasing control lines 64 and 66 so that shroud elements 92 and 94 and overhanging section 90 increasingly open the respective jet ports 56 through 62, the pressure within respective spors 37 through 42 and 31 through 36 is reduced and consequently the form drag on the left hand and right hand sides of device 10 is correspondingly reduced. As a result, the horizontal and vertical travel of device 10 may be controlled.

Figure 11:
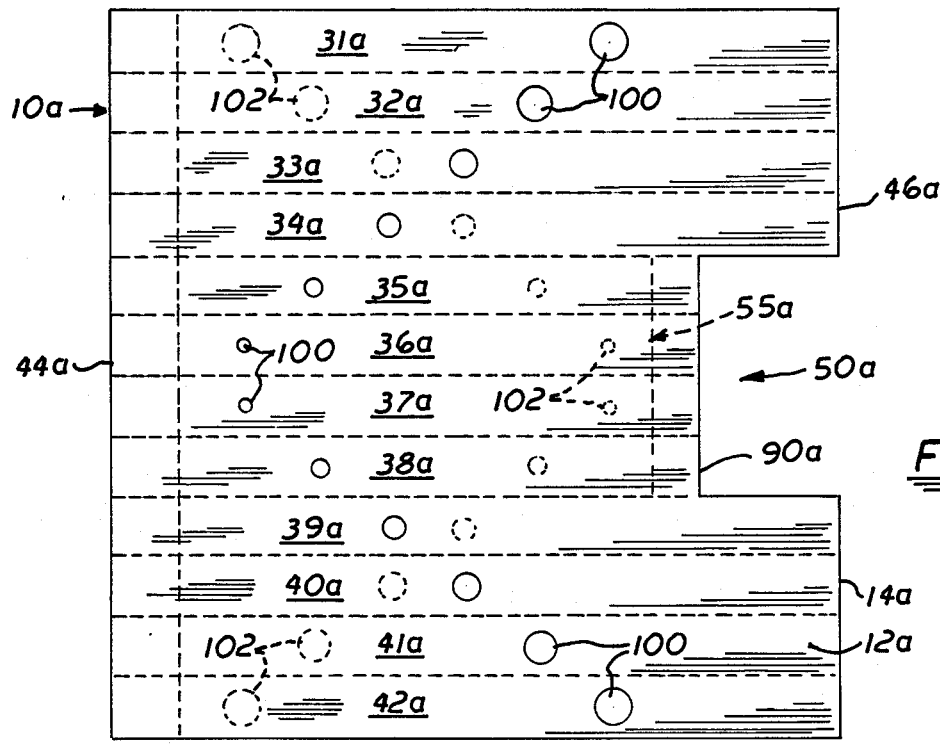
FIG. 11 is a top plan view of an alternative pressure flow control device according to this invention.

An alternative fluid flow control device 10a is shown in FIG. 11. Recess 50a formed in trailing end 46a of device 10a does not include shroud means. However, an overhanging portion 90a is provided to control fluid flow out of the jet port means 55a defined by the open aft ends of the four central spors 35a through 38a. Device 10a further includes a first plurality of Jordan clusters 100 formed in first skin means 12a and a second plurality of Jordan clusters 102 formed in second skin means 14a. The Jordan clusters 100, 102 comprise circular or alternatively shaped air passages. Each passage of first Jordan clusters 100 is disposed in the first skin in a respective one of spors 31a through 42a. Similarly each one of the passages in second Jordan clusters 102 is formed through skin 14a through a respective one of spors 31a through 42a. The first Jordan clusters 100 and second Jordan clusters 102 are spaced apart longitudinally one from the other across first skin 12a and second skin 14a respectively in inverted V configurations. Of course, at the two points where the V configurations intersect, a first Jordan cluster 100 is congruent with respect to a correspondingly positioned second Jordan cluster 102. It should also be noted that first Jordan clusters 100 and second Jordan cluster 102 are of correspondingly reduced diameter toward the apex of the respective V configurations. This however is not a limitation of the invention as the individual air passages making up the Jordan clusters may be of varying shapes, sizes and configurations.

Figure 12:
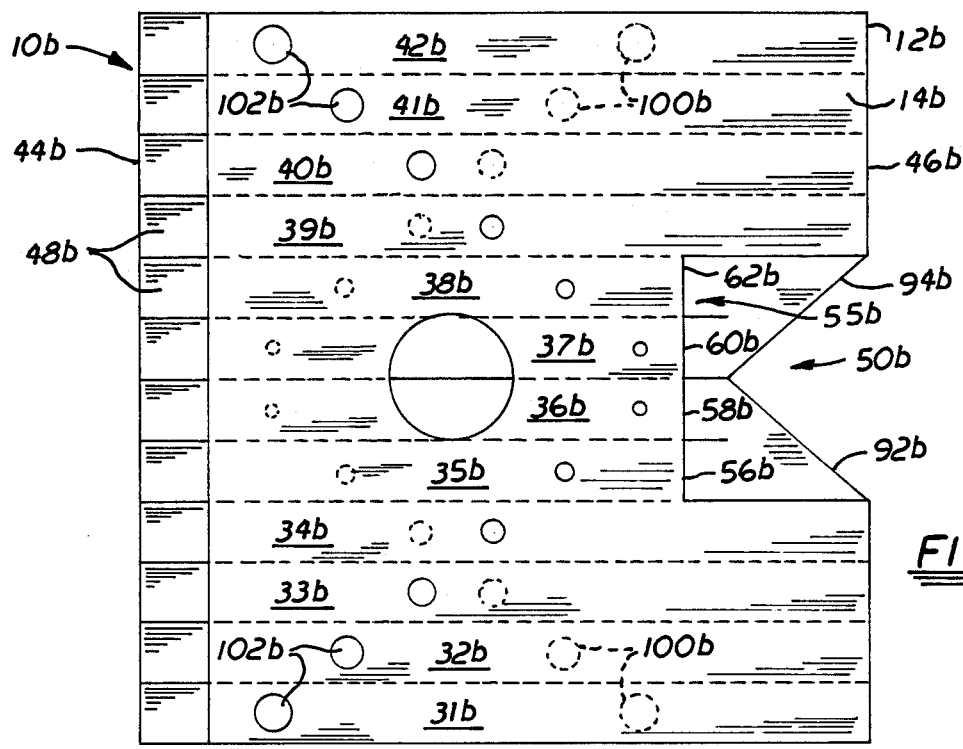
FIG. 12 is a bottom plan view of another alternative pressure flow control device according to this device.

As shown in FIG. 12 a further alternative pressure flow control device 10b may include a shroud means comprising enlarged shroud elements 92b and 94b. Shroud element 92b is integrally attached to first skin means 12b and extends from the trailing ends of spors 35b and 36b to the trailing end of adjacent closed spor 34b. Similarly, shroud element 94b is integrally attached to first skin means 12b and extends between the aft end of spors 37b and 38b to the trailing end of adjacent closed spor 39b. In each of the embodiments of FIGS. 11 and 12 the four central spors 35a through 38a and 35b through 38b respectively have open ends which define a jet port means 55a and 55b and the remaining spors in each device are closed at their aft ends.

By employing the enlarged shroud elements 92b and 94b shown at FIG. 12 the jumper is provided with increased control over fluid flow through the jet ports 56b through 62b of jet port means 55b. Such shrouds 92b and 94b are each able to restrict flow through a pair of jet ports, rather than a single jet port as is controlled by shrouds 92 and 94 of FIGS. 2 and 8–10. In particular, shrouds 92b and 94b are controlled by control lines such as previously disclosed in FIGS. 9 and 10.

Device 10b further includes a first set of Jordan clusters 100b that are formed in first skin 12b and a second set of Jordan clusters 102b that are formed in second skin means 14b. Device 10b also comprises jiro port means 106 formed in second skin 14b around the midpoint of second skin 14b. Jiro port means 106 is substantially circular in configuration and its diameter is approximately the width of two spors 36b and 37b. Fluid flowing through jiro port means 106 reacts with fluid flow pressure already present in the device by virtue of first Jordan clusters 100b, second Jordan clusters 102b and the holonomic port means 80 previously described to form a cushion of air on which the device travels. In horizontal flight Jordan clusters 100b and 102b, as well as jiro port 106, primarily expel air that has been introducted through the open leading edge of device 10b. However, particularly in vertical flight, second Jordan clusters 102b and jiro 106 may serve primarily to accept air into the device.

It is not required that the jet port means be limited to four spors or that the trailing end of the pressure flow control device be closed. Most or all of the trailing edge may be open and form jet ports so that thrust and maneuverability are enhanced. For example, an alternative fluid flow control device 10c, shown in FIGS. 13 and 14, is provided with a plurality of spors 31c through 42c, each of which has an open trailing end forming a jet port means 55c. Device 10c is not provided with either a shroud or a recess for restricting flow through jet port means 55c. However, an overhanging section 90c is integrally attached to first skin 12c and extends in an aft direction beyond the trailing end of second skin 14c. A plurality of overhang control lines 110 are attached to overhang section 90. By pulling downwardly on control lines 110 in the direction of arrow C the jumper can selectively restrict flow through one or more of the individual ports of jet port means 55c.

Figure 16:
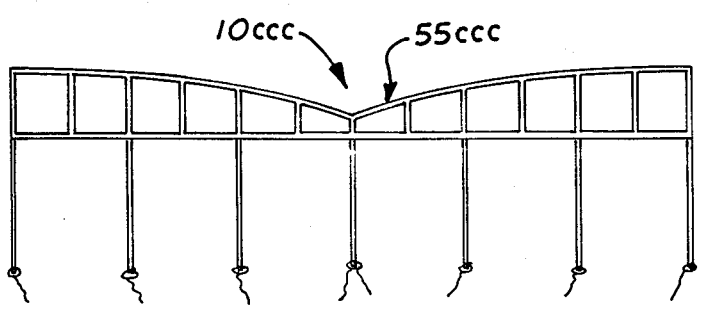
FIG. 16 is an elevational rear view of a further alternative pressure flow control device having an open trailing end that is tapered from the outboard sides to the center of the device.

Although the jet port means have heretofore been described as having a similar size and shape this is not necessarily a limitation of this invention. For example, as shown in FIG. 15 an alternative pressure flow control device 10cc may include jet port means 55cc formed along the entire trailing end 46cc of device 10cc, which jet port means are larger at the center of device 10cc and then taper to a smaller cross-sectional shape proximate the outboard ends. Alternatively, as shown in FIG. 16 a pressure flow control device 10ccc may exhibit an entirely open trailing end having jet port means 55ccc which have a larger cross-sectional area proximate the outboard ends of the device and a correspondingly reduced cross-sectional area proximate the center of the device.

Additional means for restricting the fluid flow through the jet port means are shown in FIGS. 17, 18. For example, individual ports 35d through 38d of jet port means 55d may be selectively closed by respective jet port control lines 120. A ring 122 or similar means attaches control line 120 to a suitable connector post or other connector element 124 carried by the inside surface of first skin means 12d within a respective jet port such as ports 56d and 62d. Each control line 120 extends through a respective jet port control line guide means 126, comprising a grommet or similarly reinforced opening skin 14d, and to the operator. An individual jet port, for example port 56d of jet port means 55d, is selectively closed by pulling downwardly on its respective control line 120 in the direction arrow C. This causes skin 12d to at least partly block port 56d thereby increasing the pressure in spor 35d and the form drag on that portion of device 10d.

Alternatively, an individual jet port, for example jet port 56e shown in FIG. 18, may be partly or fully closed by a jet port flap means 130 that is hingeably attached along seam 132 to first skin means 12e within spor 35e. A jet port flap control line 134 is attached at 136 to the distal end of flap means 130. Control line 134 extends downwardly through a guide means 138 in second skin means 14e and from there to the jumper or other operator. During normal operation a resilient strap or chord 140 biases flap means 130 into an open condition so that air is expelled through jet port 56e in order to partially or fully control line 134 downwardly in the direction of arrow E. This lowers flap 130 so that jet port 56e is closed and the pressure within sport 35e and those spors with which it communicates is increased to the degree desired. When control line 134 is released resilient strap 140 returns flap 130 to the open condition.

Fluid communication and pressure flow between the individual spors may also be controlled to regulate the relative internal fluid pressures in various portions of the pressure flow control device. In particular, this is accomplished by providing means for restricting the fluid flow through the holonomic port means. For example, as shown in FIG. 19 three holonomic ports 80f are formed in the third skin 16f disposed between spors 34f and 35f. Respective holonomic port flaps 150 are attached within spor 35f adjacent to each holonomic port 80f and, in particular, each flap 150 is connected to third skin 16f along a generally vertical seam 152. A single holonomic port flap control line 154 is connected to the tapered distal end of each of flaps 150. Control line 154 then extends through third skin 16f and through a similar guide means 158 formed through second skin 14 in spor 34f. From there, control line 154 extends to the operator. During normal use, fluid communication between spors 34f and 35f through holonomic ports 80f forces flaps 150 into an open condition. To restrict this fluid flow the operator pulls control line 154 downwardly in the direction of arrow F. As a result, flaps 150 are pulled to partially or fully cover ports 80f so that respective pressures in spors 34f and 35f and the spors communicating therewith are controlled.

Figure 20:
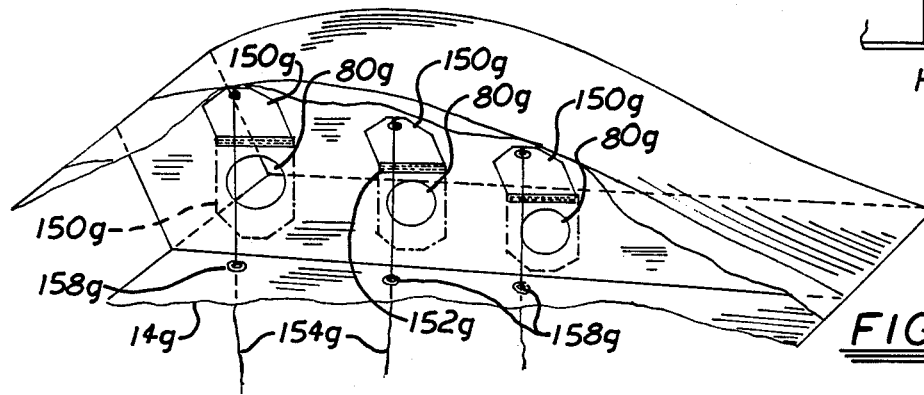
FIG. 20 is a fragmentary axonometric view of an alternative flap means mounted within a spor and a control line attached thereto for selectively closing holonomic port means formed through the third skin means of the spor.

Alternatively, as shown in FIG. 20, holonomic ports 80g may be selectively covered by flap means 150g that are hingeably attached to third skin 16g along substantially horizontal seams 152g above respective ports 80g. A plurality of holonomic port flap control lines 154g are provided. Each is attached to the tapered distal end of a respective flap 150g and extends through a respective guide means 158g formed in second skin 14g to the jumper or operator. By pulling one or more of control lines 154g downwardly in the direction of arrow G the operator may selectively close associated flaps 150g to the degree desired. A resilient strap, previously shown in FIG. 18, may be utilized to bias open flaps 150g when the control lines 154g are released.

The holonomic ports may be alternatively covered or blocked to restrict fluid flow therethrough in a manner analogous to that shown in FIG. 17 by attaching a control line to the first skin, or alternatively to the third skin, and running that control line downwardly through the second skin to the jumper. By pulling downwardly on the control line in a manner analogous to that shown in FIG. 17 the holomonic ports may be partly or fully closed or blocked.

Figure 21:
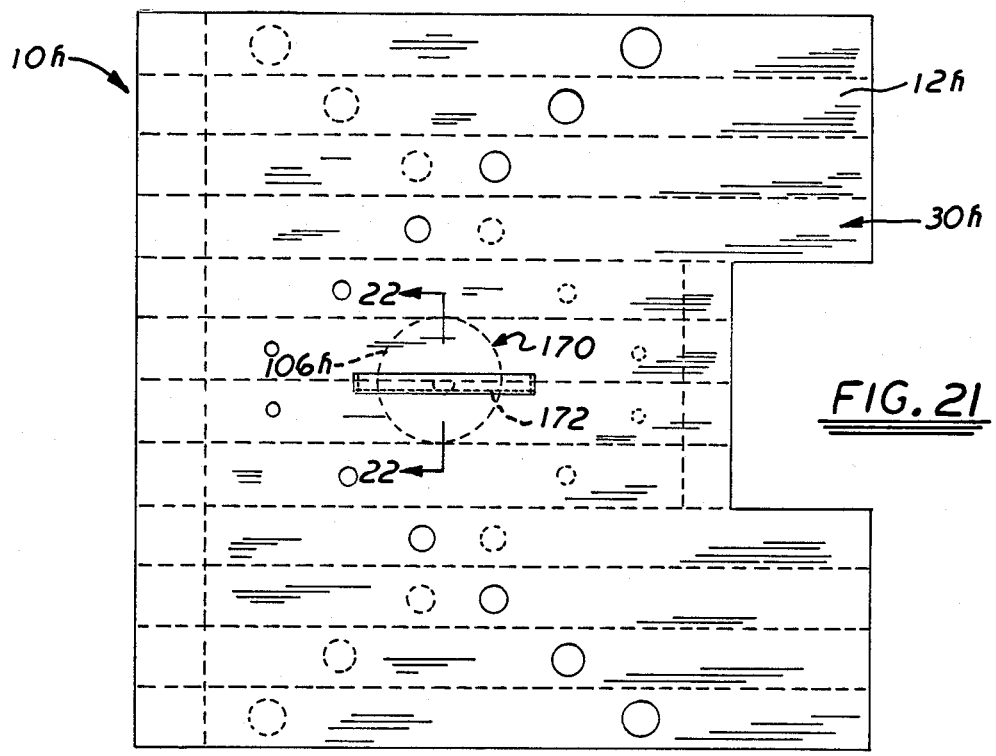
FIG. 21 is a top plan view of the fluid flow control device having vent means formed in the first skin means thereof.
Figure 22:
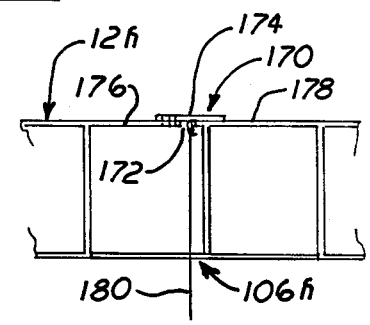
FIG. 22 is a fragmentary elevational view of the vent means and a control line for selectively opening the vent means.
Figure 23:
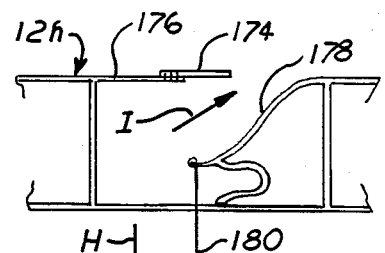
FIG. 23 is a view similar to FIG. 22 of the vent means in its open condition.

As the pressure flow device descends through the atmosphere the underlying and internal pressures on the device are significant. This is particularly true where the device employs a jiro port such as shown in FIG. 12. If this pressure is not equalized somewhat by moving sufficient mounts of air through the device, the device may tend to stall. Accordingly, in order to reduce the pressure that builds up within the device, vent means 170 are provided, as shown in FIGS. 21 through 23. In particular vent means 170 is formed by making a longitudinal slit 172, shown in FIG. 22, in first skin 12h. A first skin extension piece 174 is attached to one section 176 of first skin 12h and this extension piece overlaps the opposite section 178 of skin 12h typically by several inches. Vent means 170 is formed substantially centrally in first skin 12h over the area defined by jiro port means 106h. The vent means is selectively opened to relieve pressure within spor means 30h by a control line 180 that is attached to section 178 of first skin 12h and extends through jiro port means 106h to the jumper.

As shown in FIG. 23, by pulling downwardly on control line 180 in the direction of arrow H, the jumper separates skin section 178 from skin extension piece 174 and as a result allows excess air pressure which has built up within spor means 30h, via leading edge ports 48h, Jordan clusters 102h and jiro port 106h, to be vented from the device in the direction of arrow I through vent means 170.

It should be noted that the jet port, holonomic port and vent control lines 110, 120, 134, 154, 154g and 180 that extend from the device to the operator have been omitted from FIG. 1 for clarity.

The means for restricting fluid flow through the jet ports and holonomic ports contribute significantly to improved maneuverability and stability of the pressure flow control device. The spors 56, 58, 60 and 62 that define the jet port means form the transitive manifold 50 shown in FIGS. 2 which manifold expels through the jet port means 55 air introduced into the device through the leading end openings 48, the jiro port 106 and the Jordan clusters 102 and transmitted internally to manifold 59 by the holonmic ports 80. The jet port control means, including the overhang 90, the shrouds 92 and 94, the flap means 130 and the various control lines disclosed in FIGS. 9, 10, 13, 14, 15 and 18 permit the pressure flow through the jet port means to be closely controlled. As a result the pressure may be precisely adjusted within the individual spors. This allows the operator to provide the device with a flow device transitive camber that enables the form drag on the device to be varied according to the maneuver desired. For example, by lowering the shrouds 92 and 94 and/or overhanging section 90 air is introduced into jet portion means 55. As a result, horizontal and reverse flight may be accomplished. Similarly, by controlling the pressures within the respective spors, by means of the holonomic port controls and/or the jet port controls, the operator may selectively increase the internal pressure on one side of the fluid flow control device and reduce pressure on the other side. This increases the form drag on the increased pressure side and enables the device to turn in that direction.

It will thus be seen that the objects made apparent from the preceding description are efficiently attained and certain changes may be made in the above construction without departing from the scope of the invention, and it is intended that all matter contained in the above description and shown in the accompanying drawings be interpreted as illustrative and not in a limiting sense.

It is also understood that the following claims are intended to cover all of the generic and specific features of the invention herein described, and all statements of the scope of the invention which, as a matter of language, may be said to fall therebetween.

Now the invention having been described, what is claimed is:

1. A pressure flow control device of the type used primarily to maintain both vertical and horizontal stability and maneuverability in a predetermined fluid environment said device comprising;
   a first skin means of predetermined configuration;
   a second skin means of predetermined configuration disposed in substantially spaced apart relation from said first skin means;
   a plurality of third skin means disposed in interconnecting relation between said first and second skin means;
   spor means defined by said first, second and third skin means, one end of said spor means at least partially defining a leading edge of said device, the oposite end of said spor means at least partially defining the trailing edge of said device;
   holonomic port means formed in at least one of said third skin means;
   jet port means defined by at least a portion of said spor means generally proximate the lateral center of the device being open at its aft end, said jet port means including a trailing end that is recessed relative to the aft end of an adjacent section of said spor means; and
   means for selectively restricting fluid flow through at least a portion of the group consisting of said jet port means and said holonomic port means to control fluid pressures within said spor means, said means for restricting including an extension section of said first skin means that is attached to the trailing end of said jet port means and extends in an aft direction beyond said second skin means of said jet port means, 2. The device of claim 1 further including control means operatively connected with said second skin means for controlling the passage of said device through a predetermined fluid environment with respect to both horizontal and vertical planes.

3. The device of claim 1 in which said restricting means includes at least a segment of said jet port means that is recessed relative to the aft end of an adjacent section of said spor means.

4. The device of claim 1 in which said extension section includes an overhanging section attached to the trailing end of said first skin means of said jet port means, extending in an aft direction beyond said second skin means of said jet port means and defining a trailing edge that is generally parallel with the trailing edge of said spor means and said jet port means.

5. The device of claim 4 in which said restricting means further includes overhang control means operatively connected to said overhanging section for selectively covering at least a portion of said jet port means with said overhanging section to restrict fluid flow therethrough.

6. The device of claim 1 in which said restricting means includes shroud means connected to the aft end of said portion of said spor means defining said jet port means.

7. The device of claim 6 in which said restricting means includes at least a segment of said jet port means that is recessed relative to the aft end of an adjacent said spor means and in which said shroud means is interconnected to said first skin means between said recessed segment of said jet port means and said adjacent section of said spor means.

8. The device of claim 6 in which said extension section includes shroud means interconnected to said first skin means between said recessed jet port means and said adjacent section of said spor means and defining a trailing edge that is slanted relative to the trailing edges of said spor means nd said jet port means.

9. The device of claim 8 in which said restricting means includes at least a portion of said spor means adjacent said recessed segment of said jet port means.

10. The device of claim 8 in which said shroud means is attached to said recessed segment substantially between a pair of adjacent third skin means.

11. The device of claim 8 in which said shroud means is attached to said recessed segment substantially between at least three adjacent third skin means.

12. The device of claim 8 in which said restricting means includes shroud control means operatively connected to said shroud means for selectively covering at least a portion of said jet port means with said shroud means to restrict fluid flow therethrough.

13. The device of claim 1 in which said restricting means includes jet port control means operatively connected to said first skin means within said jet port means for selectively blocking at least a portion of said jet port means with said first skin means to restrict fluid flow therethrough.

14. The device of claim 13 in which said jet port control means includes a jet portion control line attached to said first skin means and said second skin means includes jet port control guide means for passing said jet port control line therethrough, said control line being pulled through said jet port means to block at least a portion of said jet port means with said first skin means.

15. The device of claim 1 in which said restricting means includes jet port flap means attached within said jet port means to said first skin means and jet port flap control means operatively connected to said jet port flap means for selectively covering at least a portion of said jet port means with said jet port flap means to restrict fluid flow therethrough.

16. The device of claim 15 in which said jet port flap control means includes a jet port flap control line attached to said jet port flap and said second skin means includes jet port flap control line guide means for passing said jet port flap control line therethrough, said jet port flap control line being pulled through said jet port flap control line guide means to cover at least a portion of said jet port means with said jet port flap means.

17. The device of claim 15 further including elastic means for biasing said jet port flap means into an open condition and permitting said flap means to selectively close in response to operation of said jet port flap control means.

18. The device of claim 1 in which said restricting means includes holonomic port control means operatively connected to at least one of the group consisting of said first skin means and said third skin means within said spor means for selectively blocking at least a portion of said holonomic port means to restrict fluid flow therethrough.

19. The device of claim 18 in which said holonomic port control means includes a holonomic port control line attached to said first skin means and said second skin means includes second skin guide means for passing said holonomic port control line therethrough, said holonomic port control line being pulled through said second skin guide means to block at least a portion of said holonomic port means with said first skin means.

20. The device of claim 18 in which said holonomic port control means includes a holonomic port control line attached to said third skin means and said second skin means includes holonomic port control line guide means for passing said holonomic port control line therethrough, said holonomic port control line being pulled through said holonomic port control line guide means to block at least a portion of said holonomic port means with said third skin means.

21. The device of claim 1 in which said restricting means includes holonomic flap means attached within said spor means to said third skin means and holonomic flap control means operatively connected to said holonomic flap means for selectively covering at least a portion of said holonomic port means with said holonomic flap means to restrict fluid flow therethrough.

22. The device of claim 21 in which said holonomic flap control means includes a holonomic flap control line attached to said holonomic flap means, said third skin means includes a first holonomic flap control line guide means for passing said holonomic flap control line therethrough and said second skin means includes a second holonomic flap control line guide means for passing said holonomic flap control line therethrough, said holonomic flap control line being pulled through said first and second holomonic flap control line guide means to cover at least a portion of said holonomic port means with said holonomic flap means.

23. The device of claim 21 in which said holonomic flap control means includes a holonomic flap control line attached to said holonomic flap means and said second skin means includes a holonomic flap control line guide means for passing said holonomic flap control line therethrough, said holonomic flap control line being pulled through said holonomic flap control line guide means to cover at least a portion of said holonomic port means with said holonomic flap means.

24. The device of claim 21 further including resilient means for biasing said holonomic flap means into an open condition and permitting said holonomic flap means to close in response to operation of said holonomic port flap control means.

25. The device of claim 1 in which said spor means includes a centrally located third skin means located within said jet port means, said centrally located third skin means, having a single holonomic port.

26. The device of claim 1 in which said aft end of said spor means is open.

27. The device of claim 1 in which said at least a portion of said aft end of said spor means is closed by interconnecting said first and second skin means.

28. The device of claim 1 wherein the shape and cubic displacement of said spor means are determined by said third skin means and depend on said predetermined configuration.

29. The device of claim 28 wherein the distance between said first and second skin means is variable from said leading edge to said trailing edge.

30. The device of claim 28 wherein the distance between said first and second skin means at the middle of said device is relatively greater than said distance at said leading and trailing edge of said device.

31. The device of claim 28 wherein said predetermined configuration is substantially rectangular.

32. The device of claim 28 in which said predetermined configuration is substantially square.

33. The device of claim 29 wherein the distance between said first and second skin means at said leading edge is relatively greater than said distance at said trailing edge, and wherein said third skin means is correspondingly configured to define a substantially triangular configuration, the apex of said triangular configuration being substantially adjacent said trailing edge.

34. The device of claim 1 wherein said holonomic ports are formed in said third skin means with a midpoint of each of said holonomic ports defining a line substantially parallel to said leading edge.

35. The device of claim 34 wherein said holonomic ports are of greatest size at the centermost of said third skin means and are of correspondingly reducing size toward the outermost of said third skin means.

36. The device of claim 1 further including a plurality of first Jordan clusters formed in said first skin means and a plurality of second Jordan clusters formed in said second skin means.

37. The device of claim 36 wherein said first Jordan clusters are of greatest size at the outermost edges of said first skin means and are of correspondingly reducing size toward the center of said first skin means.

38. The device of claim 36 wherein said second Jordan clusters are of greatest size at the outermost edges of said second skin means and are of correspondingly reducing size toward the center of said second skin means.

39. The device of claim 36 wherein said first and second pluralities of Jordan clusters are spaced apart one from the other across at least most of said first and second skin means.

40. The device of claim 1 further including a plurality of first Jordan clusters formed in said first skin means.

41. The device of claim 1 further including a plurality of second Jordan clusters formed in said second skin means.

42. The device of claim 1 wherein said jet port means is formed at substantially the middle of said trailing edge.

43. The device of claim 1 wherein a jiro port means is formed at substantially the center of said second skin means.

44. The device of claim 1 further comprising payload means depending from said device and control means operatively interconnecting said payload means with said second skin means.

45. The device of claim 44 further including a jiro port means formed at substantially the center of said second skin means and wherein said payload means depends from said device beneath the area defined by said jiro port means.

46. The device of claim 45 wherein said payload means depends from said device beneath the center of said jiro port means.

47. The device of claim 1 further including vent means formed in said first skin means and being alternatable between an open and closed condition and vent control means operatively connected to said vent means for selectively opening said vent means to exhaust fluid from said spor means.

48. The device of claim 44 wherein a jiro port means is formed at substantially the center of said second skin means and wherein said vent means is formed above the are defined by said jiro port means.

49. A pressure flow control device of the type used primarily to maintain both vertical and horizontal stability and maneuverability in a predetermined fluid environment said device comprising;
 a first skin means of predetermined configuration;
 a second skin means of predetermined configuration disposed in substantially spaced apart relation to said first skin means;
 a plurality of third skin means disposed in interconnecting relation between said first and second skin means;
 spor means defined by said first, second and third skin means, one end of said spor means at least partially defining a leading edge of said device, the opposite end of said spor means at least partially defining the trailing edge of said device;
 holonomic port means formed in at least one of said third skin means;
 jet port means defined by at least a portion of said spor means generally proximate the lateral center of the device being open at its aft end;
 said jet port means including a trailing end that is recessed relative to the aft end of an adjacent section of said spor means; and
 means for selectively restricting fluid flow through said jet port means to control fluid pressures therein including shroud means connected to the aft end of said portion of said spor means defining said jet port means and being integral with said first skin means and extending in an aft direction beyond the second skin means of said jet port mean, and shroud control means operatively connected to said shroud means for selectively covering at least a portion of said jet port means with said shroud means; whereby the passage of said device through a predetermined fluid environment may be controlled with respect to both horizontal and vertical planes.

50. A pressure flow control device of the type used primarily to maintain both vertical and horizontal stability and maneuverability in a predetermined fluid environment said device comprising;
 a first skin means of predetermined configuration;
 a second skin means of predetermined configuration disposed in substantially spaced apart relation from said first skin means;
 a plurality of third skin means disposed in interconnecting relation between said first and second skin means;
 spor means defined by said first, second and third skin means, one end of said spor means at least partially defining a leading edge of said device, the opposite end of said spor means at least partially defining the trailing edge of said device;
 holonomic port means formed in at least one of said third skin means;
 jet port means defined by at least a portion of said spor means being open at its aft end;
 means for selectively restricting fluid flow through said holonomic port means to control fluid pressures within said spor mean including holonomic flap means attached within said spor means to said third skin means and holonomic flap control means operatively connected to said holonomic flap means for selectively covering at least a portion of said holonomic port means with said holonomic flap means to restrict fluid flow therethrough; and
 control means operatively connected with said second skin means, whereby the passage of said device through a predetermined fluid environment may be controlled with respect to both horizontal and vertical planes.

51. A pressure flow control device of the type used primarily to maintain both vertical and horizontal stability and maneuverability in a predetermined fluid environment, said device comprising;
 a first skin means of predetermined configuration;
 a second skin means of predetermined configuration disposed in substantially spaced apart relation from said first skin means;
 a plurality of third skin means disposed in interconnecting relation between said first and second skin means;
 spor means defined by said first, second and third skin means, one end of said spor means at least partially defining a leading edge of said device, the opposite end of said spor means at least partially defining the trailing end of said device;
 holonomic port means formed in at least one of said third skin means;
 jet port means defined by at least a portion of said spor means being open at its aft end; and
 means for selectively restricting fluid flow through at least a portion of the group consisting of said jet port means and said holonomic port means to control fluid pressures within said spor means, said restricting means including holonomic port control means operatively connected to at least one of the group consisting of said first skin means and said third skin means within said spor means for selectively blocking at least a portion of the holonomic port means to restrict fluid flow therethrough, said holonomic port control means including a holonomic port control line attached to said third skin means and said second skin means including holonomic port control line guide means for passing said holonomic control line means therethrough, said holonomic port control lines being pulled through said holonomic port control line guide means to block at least a portion of said holonomic port means with said third skin means.

52. A pressure flow control device of the type used primarily to maintain both vertical and horizontal stability and maneuverability in a predetermined fluid environment, said device comprising;
 a first skin means of prdetermined configuration;
 a second skin means of predetermined configuration disposed in substantially spaced apart relation from said first skin means;

a plurality of third skin means disposed in interconnecting relation between said first and second skin means;

spor means defined by said first, second and third skin means, one end of said spor means at least partially defining a leading edge of said device, the opposite end of said spor means at least partially defining the trailing end of said device;

holonomic port means formed in at least one of said third skin means;

jet port means defined by at least a portion of said spor means being open at its aft end; and means for selectively restricting fluid flow through at least a portion of the group consisting of said jet port means and said holonomic port means to control fluid pressures within said spor means, said restricting means including holonomic flap means attached within said spor means to said third skin means and holonomic flap control means operatively connected to said holonomic flap means for selectively covering at least a portion of said holonomic port means with said holonomic flap means to restrict fluid flow therethrough.

* * * * *

UNITED STATES PATENT AND TRADEMARK OFFICE
CERTIFICATE OF CORRECTION

PATENT NO. : 4,771,970
DATED : September 20, 1988
INVENTOR(S) : Stephen J. Sutton It is certified that error appears in the above-identified patent and that said Letters Patent are hereby corrected as shown below:

Claim #1, at column 13, line 33, the word "oposite" should be --opposite--.

Claim #1, at column 13, line 52, the "," should be --.--.

Claim #14, at column 14, line 45, the word "portion" should be --port--.

Claim #27, at column 16, line 1, the word "said" should be deleted altogether.

Claim #48, column 17, line 15, the word "are" should be --area--.

Signed and Sealed this

Twenty-fifth Day of April, 1989

Attest:

DONALD J. QUIGG

Attesting Officer

Commissioner of Patents and Trademarks